United States Patent
Yamamoto et al.

(10) Patent No.: US 6,553,374 B1
(45) Date of Patent: Apr. 22, 2003

(54) METHOD FOR CONTROLLING FILE PROCESSING, AND DATA PROCESSING APPARATUS AND STORAGE MEDIUM THEREFOR

(75) Inventors: Yuki Yamamoto, Toyama (JP); Makoto Shiotsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/318,831

(22) Filed: May 26, 1999

(30) Foreign Application Priority Data

May 26, 1998 (JP) ............................. 10-144799

(51) Int. Cl.[7] ............................................. G06F 17/30
(52) U.S. Cl. ......................................... 707/9; 345/968
(58) Field of Search ....................... 707/1, 6, 103, 707/102, 200, 2, 9; 345/781, 808, 809, 763, 902, 967, 968

(56) References Cited

U.S. PATENT DOCUMENTS

| | | | | |
|---|---|---|---|---|
| 5,642,521 A | * | 6/1997 | Kiuchi et al. | 707/517 |
| 5,644,736 A | * | 7/1997 | Healy et al. | 345/784 |
| 5,765,167 A | * | 6/1998 | Kiuchi et al. | 707/200 |
| 5,787,434 A | * | 7/1998 | Nakamura et al. | 707/102 |
| 5,794,251 A | * | 8/1998 | Watanabe et al. | 707/200 |
| 5,835,918 A | * | 11/1998 | Walls et al. | 707/513 |
| 5,835,921 A | * | 11/1998 | Sunakawa et al. | 707/518 |
| 5,923,846 A | * | 7/1999 | Gage et al. | 709/213 |
| 6,239,802 B1 | * | 5/2001 | Lahey et al. | 345/810 |
| 6,335,742 B1 | * | 1/2002 | Takemoto | 345/781 |
| 6,344,864 B1 | * | 2/2002 | Watanabe | 345/788 |

* cited by examiner

Primary Examiner—John Breene
Assistant Examiner—Cheryl Lewis
(74) Attorney, Agent, or Firm—Staas & Halsey LLP

(57) ABSTRACT

A method for controlling file processing including the steps of providing information for identifying a file name in a message or a text when a file name is contained in a message for notifying a result of processing or a text created on the basis of text to be processed; detecting an indication with respect to the file name; and executing processing on the file identified by the related file name, whereby, when the file name described in the message or text is displayed on the screen of the personal computer, it is possible to execute various processing on the related file without the troublesome operation which was required in the related art.

39 Claims, 15 Drawing Sheets

Where the <directory name> is the path to the remote NetWare volume or NT directory. From this directory, NetShield can broadcast or compile the alerts and reports according to its established configuration.

NOTE: The client must have write access to this <directory> location and the directory must contain the NetShield-supplied CENTALRT .TXT file.

To send a complete alerting file identifying the system and user, establish the following environment variables or add them to the AUTOEXEC .BAT file.

Fig.10A

BATCH CONVERSION UTILITY

C:\ATLAS2\JAPANESE TEXT .TXT IS TRANSLATED
INTO ENGLISH AND OUTPUT TO C:\ATLAS2\JAPANESE TEXT .TRC

C:\ATLAS2\ENGLISH TEXT .TXT IS TRANSLATED
INTO JAPANESE AND OUTPUT TO C:\ATLAS2\ENGLISH TEXT .TRA

C:\ATLAS2\JAPANESE/ENGLISH .TRA IS CONVERTED BY LEFT-RIGHT PARALLEL TRANS.
AND OUTPUT TO C:\ATLAS2\JAPANESE/ENGLISH .TRB

C:\ATLAS2\ENGLISH/JAPANESE .TRA IS CONVERTED BY LEFT-RIGHT PARALLEL TRANS.
AND OUTPUT TO C:\ATLAS2\ENGLISH/JAPANESE .TRA

A:GUIDANCE FOR USE .OAS IS TRANSLATED INTO ENGLISH AND OUTPUT TO
C:\OASYS2\(TRANS.)GUIDANCE FOR USE .OAS

Fig.10B

```
A:REQUIRED DOCUMENT .OAS IS TRANSLATED INTO ENGLISH AND OUTPUT
TO C:¥OASYS2¥(TRANS.)REQUIRED DOCUMENT .OAS
FROM C:¥SAMPLE¥ PARALLEL TRANSLATION TEXT .TXT ENGLISH IS EXTRACTED
AND OUTPUT TO C:¥SAMPLE¥ ENGLISH SENTENCE TEXT .ENG
FROM C:¥SAMPLE¥ PARALLEL TRANSLATION TEXT .TXT JAPANESE IS EXTRACTED
AND OUTPUT TO C:¥SAMPLE¥ JAPANESE SENTENCE TEXT .JPN
D:¥EJNOUN¥ NOUN¥ YNN1 .TXT IS TRANSLATED INTO ENGLISH AND OUTPUT TO A:¥YNN1 .TRA
D:¥EJNOUN¥ NOUN¥ YNN2 .TXT IS TRANSLATED INTO ENGLISH AND OUTPUT TO A:¥YNN2 .TRA
```

BATCH CONVERSION UTILITY

C:\ATLAS2\ JAPANESE TEXT .TXT IS TRANSLATED
INTO ENGLISH AND OUTPUT TO C:\ATLAS2\ JAPANESE TEXT .TRC

C:\ATLAS2\ ENGLISH TEXT .TXT IS TRANSLATED
INTO JAPANESE AND OUTPUT TO C:\ATLAS2\ ENGLISH TEXT .TRA

C:\ATLAS2\ JAPANESE/ENGLISH .TRA IS CONVERTED BY LEFT-RIGHT PARALLEL TRANS.
AND OUTPUT TO C:\ATLAS2\ JAPANESE/ENGLISH .TRB

C:\ATLAS2\ ENGLISH/JAPANESE .TRA IS CONVERTED BY LEFT-RIGHT PARALLEL TRANS.
AND OUTPUT TO C:\ATLAS2\ ENGLISH/JAPANESE .TRA

A:GUIDANCE FOR USE .OAS IS TRANSLATED INTO ENGLISH AND OUTPUT TO
C:\OASYS2\(TRANS.)GUIDANCE FOR USE .OAS

Fig.11B

```
A:REQUIRED DOCUMENT .OAS IS TRANSLATED INTO ENGLISH AND OUTPUT
TO C:¥OASYS2¥(TRANS.)REQUIRED DOCUMENT .OAS
FROM C:¥SAMPLE¥ PARALLEL TRANSLATION TEXT .TXT ENGLISH IS EXTRACTED
AND OUTPUT TO C:¥SAMPLE¥ ENGLISH SENTENCE TEXT .ENG
FROM C:¥SAMPLE¥ PARALLEL TRANSLATION TEXT .TXT JAPANESE IS EXTRACTED
AND OUTPUT TO C:¥SAMPLE¥ JAPANESE SENTENCE TEXT .JPN
D:¥EJNOUN¥ NOUN ¥NN1 .TXT IS TRANSLATED INTO ENGLISH AND OUTPUT TO A:¥NN1 .TRA
D:¥EJNOUN¥ NOUN ¥NN2 .TXT IS TRANSLATED INTO ENGLISH AND OUTPUT TO A:¥NN2 .TRA
```

C:¥ATLAS2¥ JAPANESE TEXT .TRC

| あああああああ<br>いいいいいいい<br>ううううう<br><br>(JAPANESE<br>CHARACTERS) | AAAAAAAAAAA<br>BBBBBBBBB<br>CCCCCCCCC |

METHOD FOR CONTROLLING FILE PROCESSING, AND DATA PROCESSING APPARATUS AND STORAGE MEDIUM THEREFOR

BACKGROUND OF THE INVENTION

1. Field of the Invention

The present invention relates to a method for controlling file processing in a computer such as a personal computer (also referred to as a "PC").

Various data such as document data, image data, and speech data stored in a personal computer is usually stored in units referred to as "files". Individual distinctive names, that is, file names are assigned to these files. A user retrieves a file in which data it wants is stored by the file name to have the data displayed on a display of the personal computer.

The present invention describes a method for searching for a file name and displaying the content of the related file on the screen as mentioned above or a method for other processing, that is, a method for controlling the processing of file.

2. Description of the Related Art

When a user desires to open up a file on a personal computer, generally he or she starts up file control software. When this file control software is started, the file names of the large number of files stored in the personal computer are displayed on the screen in the form of a hierarchical structure. The user searches for the name of the file he or she desires from among the variety of displayed file names and when finding the file name, executes an "OPEN" command. By the execution of this "OPEN" command, the user can view the content of the desired file on the screen.

Personal computers are utilized in an extremely large number of ways, but are particularly frequently used in the following two manners (i) and (ii):

(i) A predetermined program is executed with respect to an input file A, then an output file is created. In this manner of use, a message for notifying the user that the output file B has been created is displayed on the screen of the personal computer.

(ii) Text comprising sentences containing one or more file names is displayed on the screen of the personal computer and the user reads the content of the text.

In the manner of use (i), when viewing the above notified message, users frequently desire to confirm the content of the created output file B described therein.

Further, in the manner of use (ii), users frequently desire to confirm the content of the file having the above file name described in the text.

When desiring to confirm the content of the file in the above way, the user newly starts a file opening operation for confirming the content of the related file. At the commencement of this file opening operation, the user first memorizes the related file name. Then, as already mentioned, the user performs the series of following file opening operations comprising:

(1) Starting up the file control software;
(2) Searching for a file name matching with the one memorized from the variety of file names displayed in the hierarchical structure;
(3) Executing the "OPEN" command when the matching file name is found; and
(4) Viewing the content of the desired file opened by the execution of the command.

As explained above, in both of a case where the file name is described in a notified message and a case where the file name is described in the text being read, the user cannot immediately open the file having that file name to display its content on the screen. Namely, in order to display the content of the file having that file name on the screen, the user must re-commence the above file opening operation and perform the above series of operations (1), (2), (3), and (4). This series of operations requires for example 10 or more seconds, so has the problem of forcing a troublesome personal computer operation and un pleasant waiting time on the user.

SUMMARY OF THE INVENTION

An object of the present invention is to provide a method for controlling file processing in a computer enabling easy and convenient file operations from a file name on a display without forcing troublesome computer operation or unpleasant waiting time on the user and a data processing apparatus and a storage medium for the same.

To attain the above object, the method for controlling file processing of the present invention comprises the steps of providing information for identifying a file name in a message or a text when a file name is contained in a message for notifying a result of processing or a text created on the basis of text to be processed; detecting an indication with respect to the file name; and executing processing on the file identified by the related file name.

By this, when the file name described in the message or text is displayed on the screen of the personal computer, it is possible to execute various processing on the related file without the troublesome operation which was required in the related art.

BRIEF DESCRIPTION OF THE DRAWINGS

The above object and features of the present invention will be more apparent from the following description of the preferred embodiments given with reference to the accompanying drawings, wherein:

FIG. 9 is a view of an example of the text actually displayed on a screen 2 of a personal computer 1;

FIGS. 10A and 10B are views of an example of a message for notifying a user that an output file has been created and show an example when Japanese-English or English-Japanese translation software is executed;

FIGS. 11A and 11B are views of the state when clicking a file name in the message shown in FIG. 10A by a mouse;

FIG. 12 is a view of an example of a file opened by clicking a file name F in FIG. 11A;

DESCRIPTION OF THE PREFERRED EMBODIMENTS

Preferred embodiments of the present invention will be described next with reference to the related figures.

Figure 1:
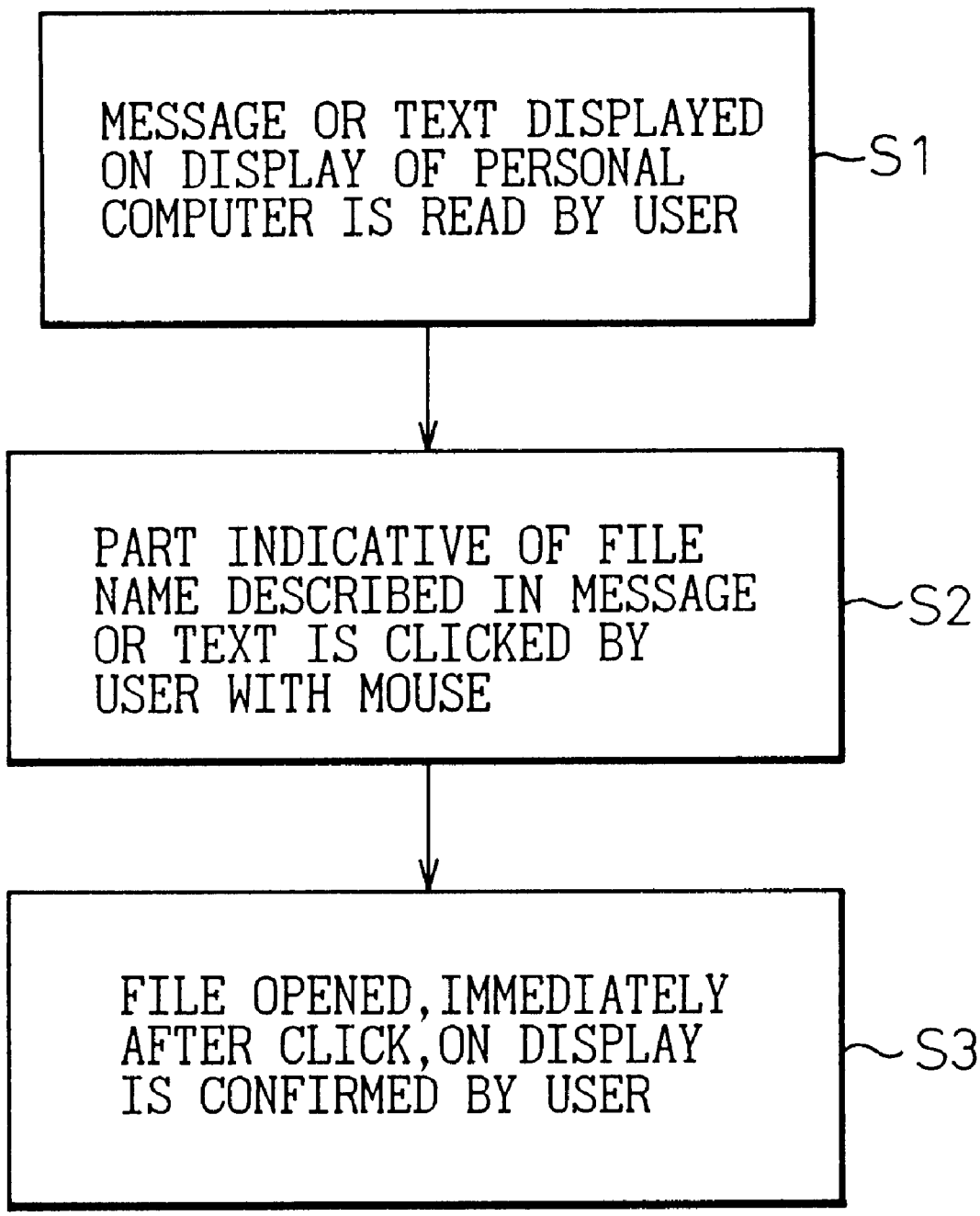
FIG. 1 is a flow chart of a mode of use of the present invention.

FIG. 1 is a flow chart of a mode of use according to the present invention. Note that first and second mode of uses are-shown together.

The first mode of use is one which displays a message which contains ID information of the file and notifies the result of the processing, detects an indication with respect to the file ID information in the displayed message, and executes prescribed processing on the file in-accordance with the detection of the indication.

Further, the second mode of use is one which detects the file ID information in a text to be processed, creates an output text containing specifying information for recognizing the file ID information from the text to be processed, displaying the content of the created output text, detecting an indication with respect to the file ID information in the content of the displayed output text by the specifying information, and executing the prescribed processing on the file in accordance with the detection of the indication.

As a means for the indication, there are various well known types such as a mouse, cursor movement keys, and a write pen. In the present invention, the explanation will be given using a mouse as a representative example.

Referring to FIG. 1, at a first step (S1), a message or output text is displayed on the screen of a computer (for example, a personal computer). The part of the ID information of the file (for example, file name) in the displayed message includes specifying information (for example, tag information) for detecting that the file ID information is indicated. Further, at the time of creation of the output text, the file ID information in the text to be processed is detected. The part of the file ID information in the output text contains specifying information for detecting that the file ID information is indicated.

In this way, at the creation of a message or output text, specifying information for detecting an indication of the file ID information is inserted by the apparatus or program of the present invention.

The user reads the content of the message or output text created in this way and displayed on the screen. This is one aspect of an ordinary personal computer operation. In this case, it often happens that a user views the file name and desires to immediately confirm the content of the related file or desires to immediately perform other processing on it. Therefore, the following steps are commenced.

In a second step (S2), the user directly clicks on the file name of the file described in the message or the file name described in the output text on the screen of the personal computer by the mouse.

In a third step (S3), the user confirms the content of the related file opened on the screen of the personal computer immediately after the click. Further, if necessary, he or she can process the data contained in the file. This is also one aspect of an ordinary personal computer operation like the first step.

In FIG. 1, the characterizing step of the present invention is the second step (S2). The processing of the related art corresponding to this second step is, as already mentioned, the series of processing of:

(1) Starting up the file control software; (2) searching for a file name matching one memorized by the user from among the variety of files displayed in a hierarchical structure; and (3) executing an "OPEN" command when finding a matching file name.

This series of processing forces troublesome personal computer operation and unpleasant waiting time on a user who wants to quickly view the content of the file or execute other processing.

Contrary to this, according to the present invention, it is sufficient for the user to simply directly click on the file name of the file desired to be quickly viewed on the screen of the personal computer as shown in the second step.

Figure 2:
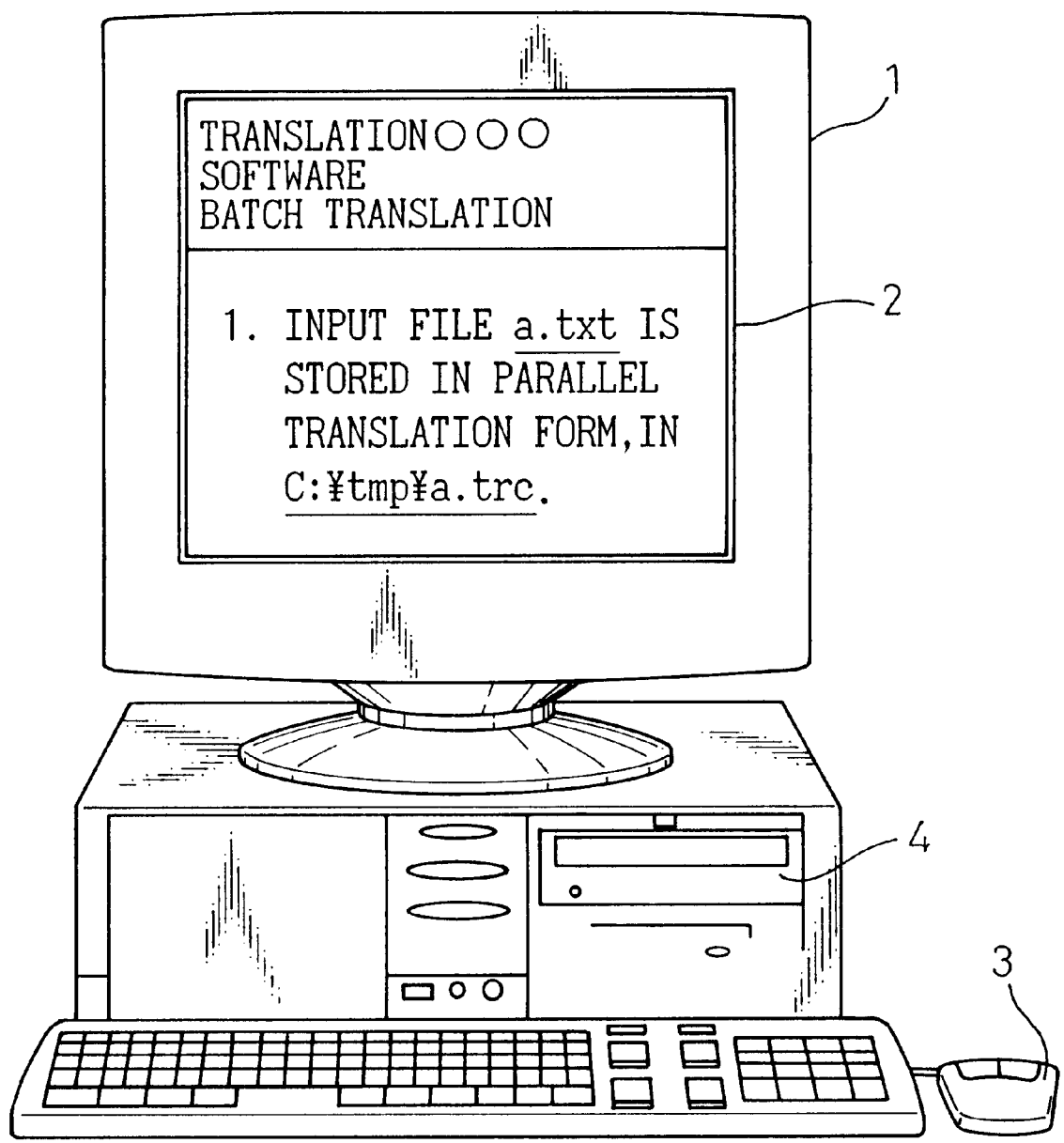
FIG. 2 is a view of a first example of the mode of use of the present invention.

FIG. 2 is a view of a first example of the mode of use of the present invention. In the FIG. 1 is a computer (personal computer), 2 is a screen constituting part of the personal computer 1, 3 is a pointing device (mouse) for specifying a desired character from among various characters appearing on the screen 2, and 4 is a storage holding device for storing programs and so on indispensable for the operation of the personal computer. In this specification, this storage holding device 4 is assumed to include the built-in memory in the personal computer body cooperating with it.

This personal computer has a similar configuration to that of well known computers and can realize various functions by installing onto its hard disk programs recorded on a storage medium such as a CD-ROM or floppy disk and starting the installed programs. In the present invention, a program makes the personal computer function as one of the components of the invention recited in the claims by being read from a storage medium, stored in the hard disk, and loaded from the hard disk onto the memory by a start instruction.

As one example of usage of a personal computer, there is batch translation processing in translation software. FIG. 2 shows an example of the display on the screen for part of that processing.

Assume that a text file A written in Japanese is to be batch translated into English. When this batch translation is ended, a message for notifying the user that the text A (input file) was translated to the text B (output file) is displayed on the display. In the actual example of FIG. 2, the message is displayed as:

"INPUT FILE a. txt IS STORED IN PARALLEL TRANSLATION FORM IN C: ¥tmp¥a. trc"

Here, the user views the file name "a.txt" or "C: ¥tmp¥a.trc" (underlined) on the screen 2 by the mouse 3 and directly clicks on the part of the file name by the mouse 3 when he or she wants to view the content of the file. Immediately after this, the content of the related file is displayed on the display 2.

Figure 3:
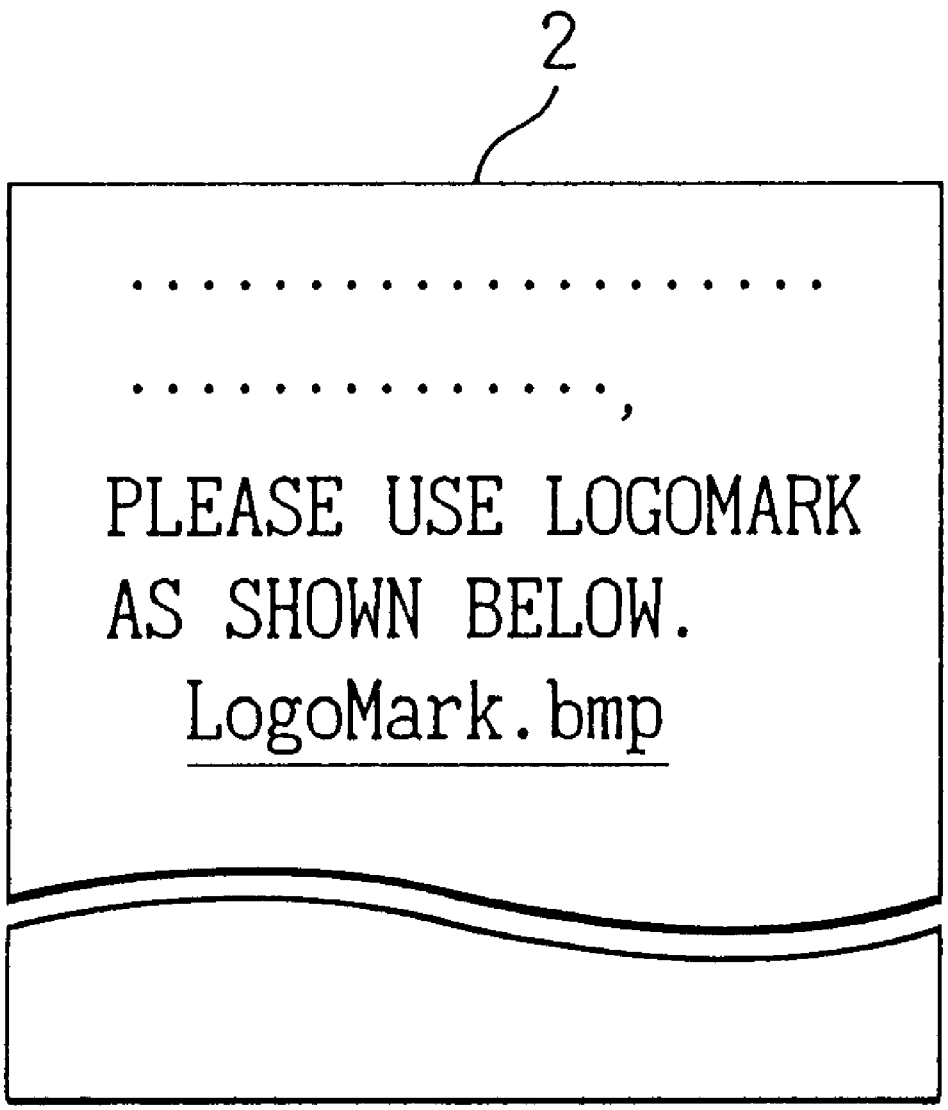
FIG. 3 is a view of a second example of the mode of use of the present invention.

FIG. 3 is a view of a second example of the mode of use of the present invention. This second example shows part of the text containing the file name. A user who wants to view the content of a file after viewing the file name "LogoMark.bmp" (underlined) in:

"PLEASE USE LOGOMARK AS SHOWN BELOW. LogoMark.bmp"

directly clicks on the part of the file name by the mouse 3 on the screen 2. Immediately after this, the content of the related file is displayed on the display 2.

The above explanation was made by taking as an example a case where a file having the file name clicked on by the mouse 3 stores character data, but the present invention can be applied even if that file stores noncharacter data. Namely, when a text containing the file name is displayed on the display 2 of the personal computer 1 and read by the user, if the file having the file name described in that text stores noncharacter data comprised by voice data or image data, it is also possible to directly click on these file names by the mouse 3, and output the related voice or image contained in the related file.

Figure 4:
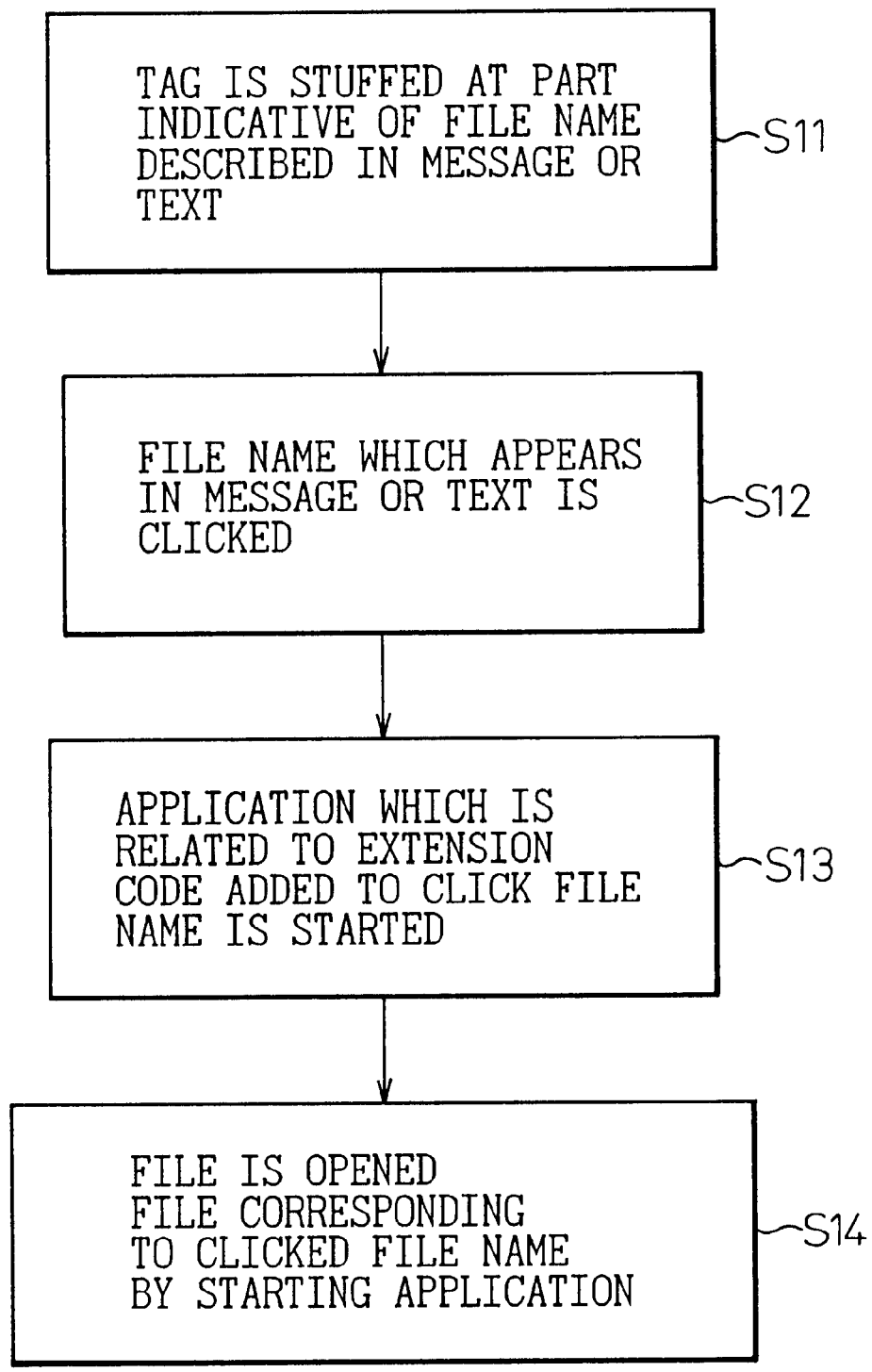
FIG. 4 is a flow chart of a method for controlling file processing of the present invention.

FIG. 4 is a flow chart of the method for controlling file processing of the present invention.

The first step (S11) is the most basic step for executing the present invention. In FIG. 4, the first step (S11) is shown covering both of the case of a message and the case of a text mentioned above, but becomes as follows when expressed independently:

An explanation will be made by taking the aforesaid batch translation as an example.

(i) Case of Message

For example, in the case of batch translation, a new output file having the text of the result of translation as its content is created by batch translating the content of the text of the file to be processed. When the processing of this batch translation is ended, a message notifying this to the user is displayed on the screen. The message contains file names of the file to be processed and the file output as a result of the translation.

At the time of creation of the message, specifying information (tags) are arranged at the front and rear of each of the file names of the file to be processed and the output file.

(ii) Case of Text

As mentioned above, in the batch translation processing, the text to be processed is batch translated and a translation result text is created.

In the translation processing, the file name described in the text to be processed is detected, specifying information (tags) are disposed at the front and rear of the file name, and a translation result text is created together with the other translation result.

In this processing, the file name is detected based on information characterizing this file name. Namely, a description containing drive information (for example, "a:" in the case of the drive a) for indicating the storage drive, directory information (for example "¥") for indicating the storage directory, and information for indicating an extension code (for example "." and three letters of the alphabet) is used as the information indicating the file name.

Here, a further detailed explanation will be made of a tag. A tag is a predetermined code. This predetermined code is a code defined in the personal computer 1, but is a code which can not be discerned (is invisible) by the user on the screen 2 of this personal computer 1. As one example of such a code, there can be mentioned a control code (carriage return etc.).

Figure 5:
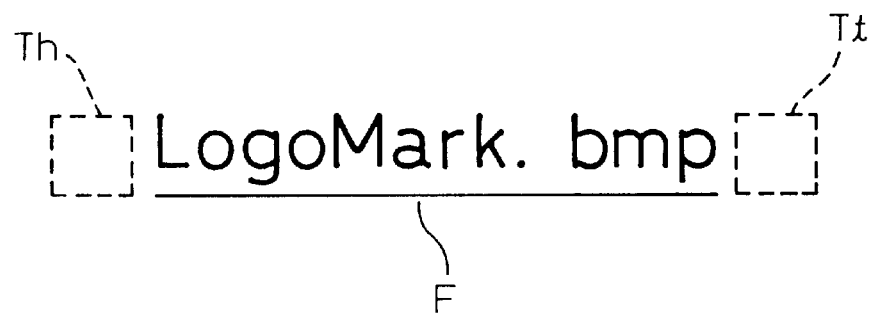
FIG. 5 is a view diagrammatically showing tags used in the present invention.

FIG. 5 is a view diagrammatically showing tags used in the present invention. The example of the present figure indicates the case where tags are stuffed in the area at the file name shown in FIG. 3. The tags (above predetermined codes) are stuffed in the area at the front and rear of the file name F as a header tag Th and a tailend tag Tt respectively. The file opening program recognizes the character data sandwiched between the two tags Th and Tt stuffed in the area at the front and rear thereof as the file name F. The file opening program is also an important program in the present invention and will be explained in detail later. Note that, in FIG. 5, the header tag Th and the tailend tag Tt are indicated by dotted lines for representing that they cannot be recognized by the user on the screen 2.

Returning to FIG. 4 again, in the second step (S12), the user clicks on the part of the file name F by the mouse 3. This second step (S12) corresponds to the second step (S2) shown in the flow chart of FIG. 1.

In the third step (S13) of FIG. 4, an application being related to an extension code added to the file name clicked on by the mouse 3 is started. In the fourth step (S14), the file corresponding to the clicked file name is opened on the screen 2 by the started application. These third step (S13) and fourth step (S14) will be concretely explained with reference to the flow charts of FIG. 6 and FIG. 7.

Figure 6:
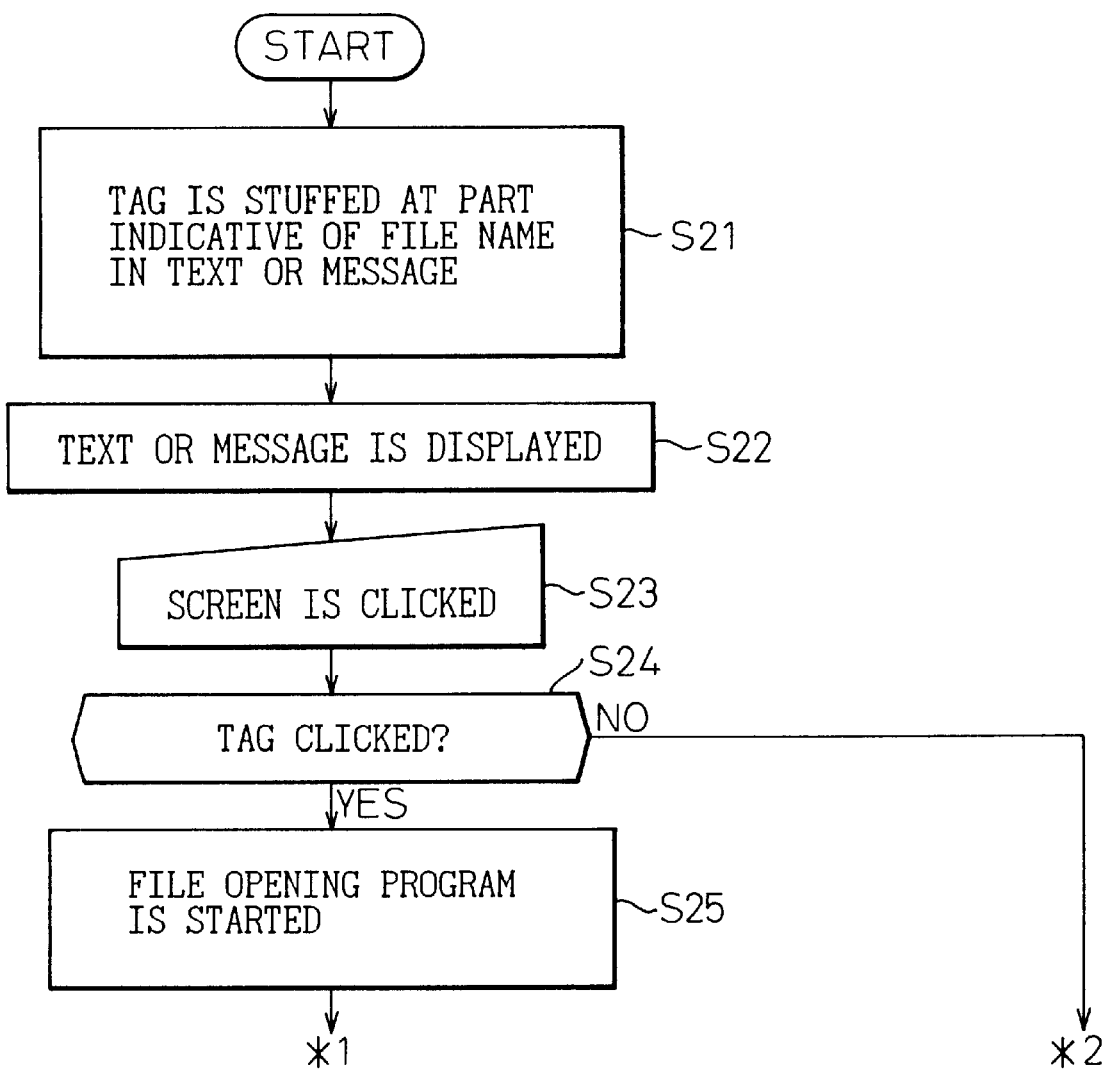
FIG. 6 is a first part of more detailed flow chart of the method of the present invention.
Figure 7:
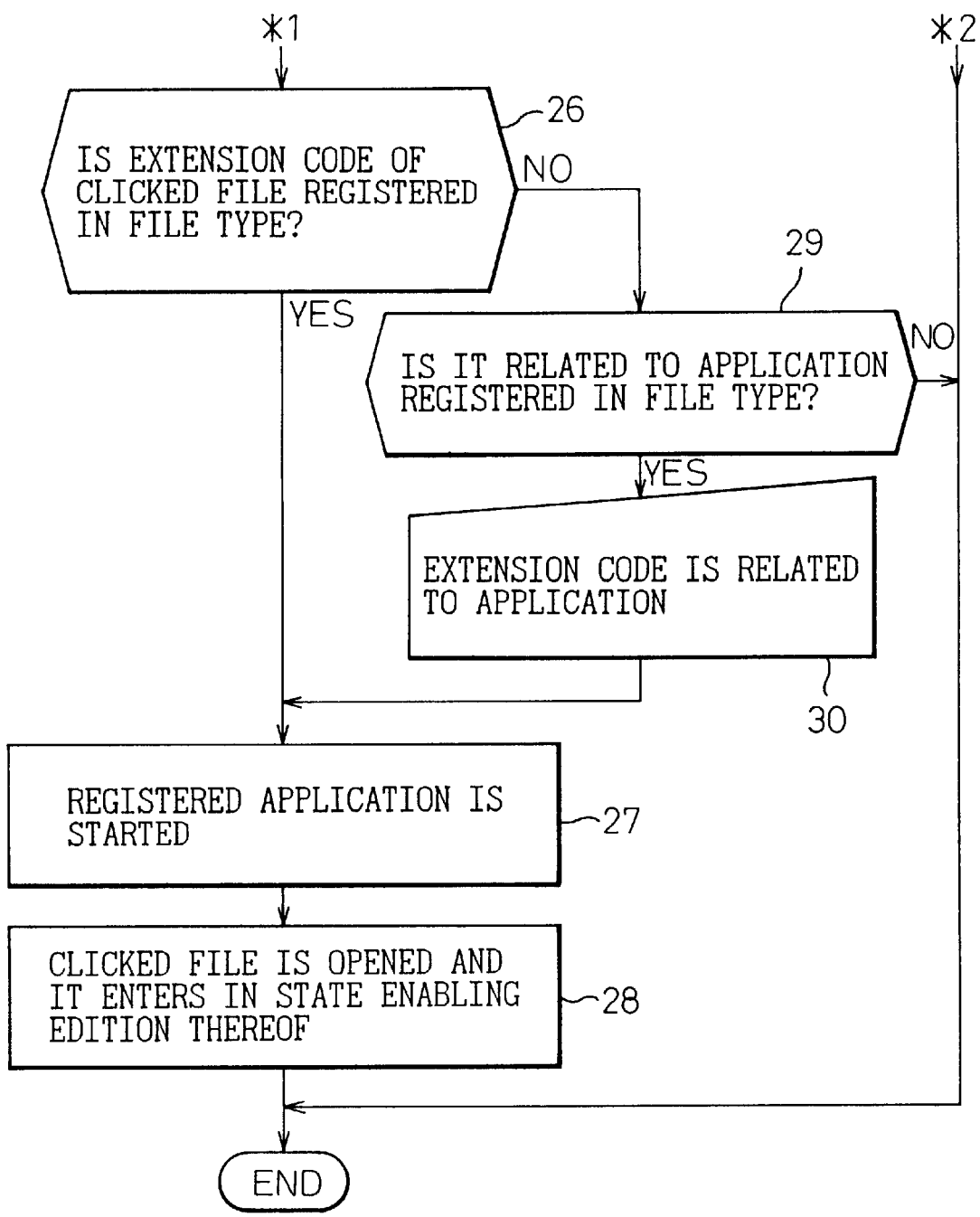
FIG. 7 is a second part of a more detailed flow chart of the method of the present invention.

FIG. 6 and FIG. 7 are first and second parts of a more detailed flow chart of the method of the present invention.

Between FIG. 6 and FIG. 7, the part of the flow chart shown in FIG. 6 particularly shows the characteristic feature of the present invention.

In the first step S21 of FIG. 6, the tags Th and Tt are stuffed in the text or message at the part where the file name F is displayed. This first step (S21) corresponds to the first step (S11) of FIG. 4.

The second step (S22) of FIG. 6 is the step operated after the user starts using the personal computer 1, and the personal computer 1 displays the text or message on the screen 2.

In the third step (S23), the required parts of the displays appearing on the screen 2 are clicked on by the user.

At the fourth step (S24), it is decided whether or not the click on the screen by the user is a click with respect to the tags (Th, Tt) or the file name sandwiched between these tags.

At the fifth step (S25), when it is decided that the click on the screen by the user is a click with respect to the tags (Th, Tt), the file opening program is started. Namely, the file opening program which is started by clicking on the tags (Th, Tt) stuffed in the area at the file name F by the mouse 3, is installed in the personal computer 1 and the file opening program is executed by using the related file name specified by the tags as a parameter. The file name serving as the parameter is extracted from between the tag Th and the tag Tt by the program and discriminated. As this file opening program, for example, "shell.exe" of the operating system (OS) can be utilized when this "shell.exe" is called up, the ordinary operating system (OS) operation is commenced in accordance with the flow chart shown in FIG. 7.

In the sixth step (S26) of FIG. 7, the file opening program (shell.exe) is executed. When it is decided that the extension code added to the related file name F beforehand is registered as a file type in the personal computer 1, the application being related to the extension code is further started. This extension code is shown as "txt" or "trc" in FIG. 2 and is shown as "bmp" in FIG. 3 as examples. When "txt" is added as the extension code, the text is brought into a state where it can be edited, and thereby a word processor function or a memo pad function (Windows) operates.

In the seventh step (S27) of FIG. 7, the application registered in the file type is started.

In the next eighth step (S28), the file clicked on by the mouse 3 is opened, and the content of the file is made editable by the word processor function.

Note that when the result of the sixth step (S26) is "NO", the ninth step (S29) and 10th step (S30) are executed.

In the present invention, a function further added to the file opening function can be realized by linking with the fifth step (S25). This can be achieved by appropriately setting the extension code or by changing the application to be related to the extension code. The types of such additional function are shown below.

(i) The content of the output file in the message can be externally transmitted or printed by operating the mouse 3.

(ii) The content of the file in the text can be externally transmitted or printed by operating the mouse 3.

(iii) The content of the file containing the voice data or the image data can be externally transmitted or the content of the file containing the image data can be printed by operating the mouse 3.

At the execution of the present invention, the following program storage medium is set in the storage holding device 4 shown in FIG. 2.

That is, this is a storage medium recording a program for enabling the personal computer 1 to execute prescribed processing on the file corresponding to the file name displayed on the screen 2.

(i) The program is one displaying a message containing the ID information of the file (file name) for notifying the user of the result of processing and stuffing the specifying information (tags) for specifying the file at the part of the file ID information in the message.

(ii) Further, the program is one for detecting the file ID information (file name) in the text to be processed and creating output text containing the specifying information (tags) for recognizing the file ID information from the text to be processed.

(iii) The program recorded on the storage medium is one detecting that the file ID information was clicked on by the mouse 3 by the specifying information and executing processing with respect to the file by using the specified related file ID information as a parameter. For example, either processing of displaying, printing, or externally transmitting the content of the related file is executed.

(iv) The program recorded on the storage medium is, if an attribute (extension code) added to the specified related file ID information and the application program are related one starting the application program, related to the attribute of the file concerned, with respect to this file to be processed.

Finally, an actual example of each unit in the present invention will be shown.

Figure 8:
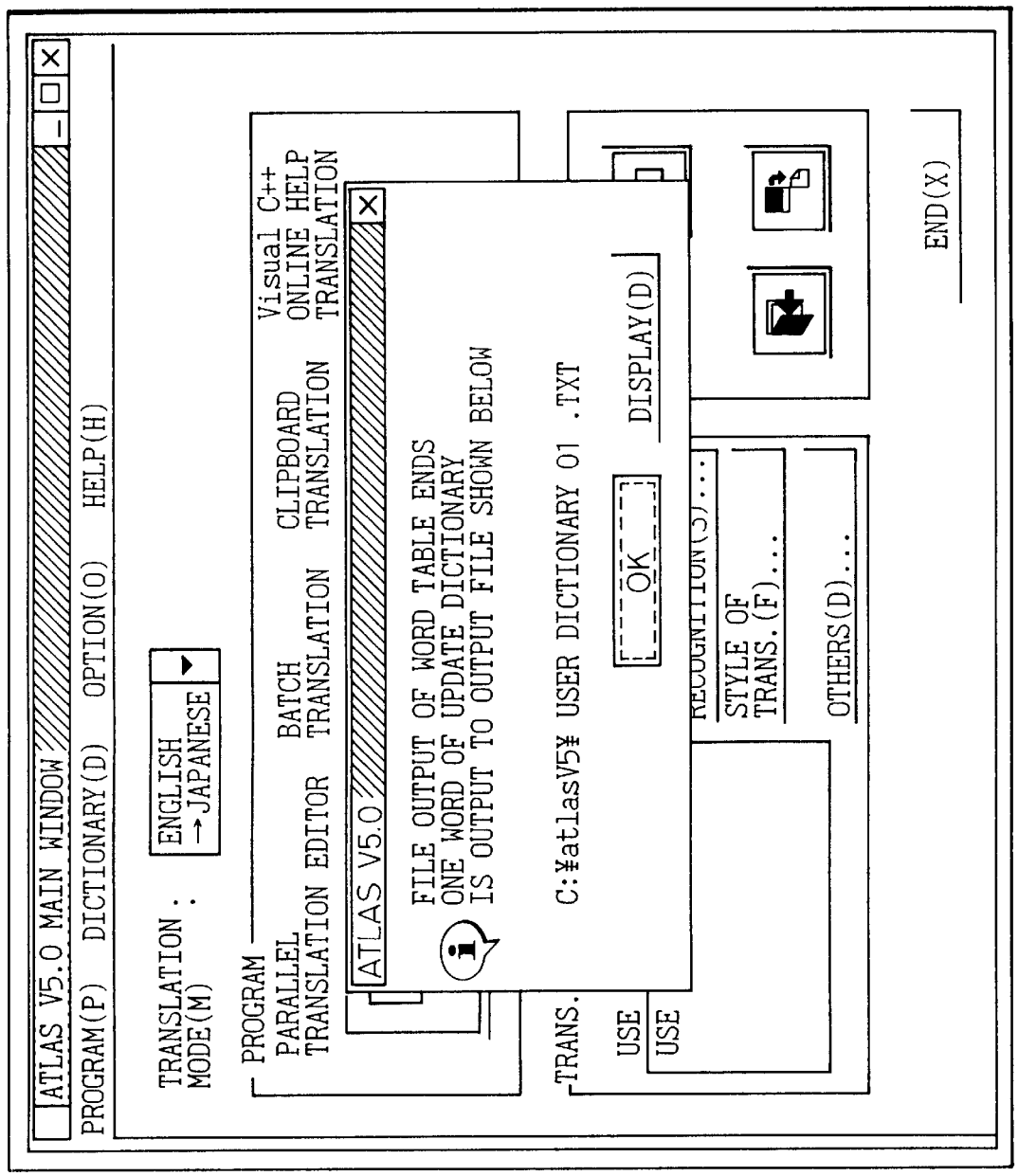
FIG. 8 is a view of an example of a message for notifying a user of the fact that an output file has been created.

FIG. 8 is a view of an example of the message, notifying a user that the output file is created, actually displayed on the screen 2 of the personal computer 1. If the file name "¥atlas V5¥USER DICTIONARY01.TXT" (TXT is the extension code) in the present figure is directly clicked on by the mouse 3, the content of the file is opened.

FIG. 9 is a view of an example of the text actually displayed on the screen 2 of the personal computer 1. When the file name "CENTALRT.TXT" or "AUTOEXEC.BAT" (BAT is an extension code) in the present figure is directly clicked on by the mouse 3, the content of the file is opened.

FIGS. 10A and 10B are views of an example of the message for notifying a user that an output file is created and show an example when Japanese-English or English-Japanese translation software is executed. The aforementioned tags are stuffed at each file name and the file name appears with underlines.

FIGS. 11A and 11B are views of the situation in which the file name in the messages shown in FIGS. 10A and 10B is clicked by the mouse. When the user desires to open and edit the file indicated by the file name F in the figure, the user simply moves the cursor C to that part by the mouse 3 and double clicks a left button.

FIG. 12 is a view of an example of the file opened by clicking on the file name F in FIG. 11A. When clicking on the file name F shown in FIG. 11A, the application corresponding to this file is started and the file is opened as shown in FIG. 12.

The file shown in FIG. 12 can be further externally transmitted by e-mail or printed by a printer. It can be stored in a floppy disk or copied too. In this case, the file may be transmitted by e-mail or printed without being displayed. Such e-mail transmission, printing processing by the printer, storage, and copying can also be realized as functions of the program of the present invention or can be realized by starting another application installed in the personal computer beforehand.

Figure 13:
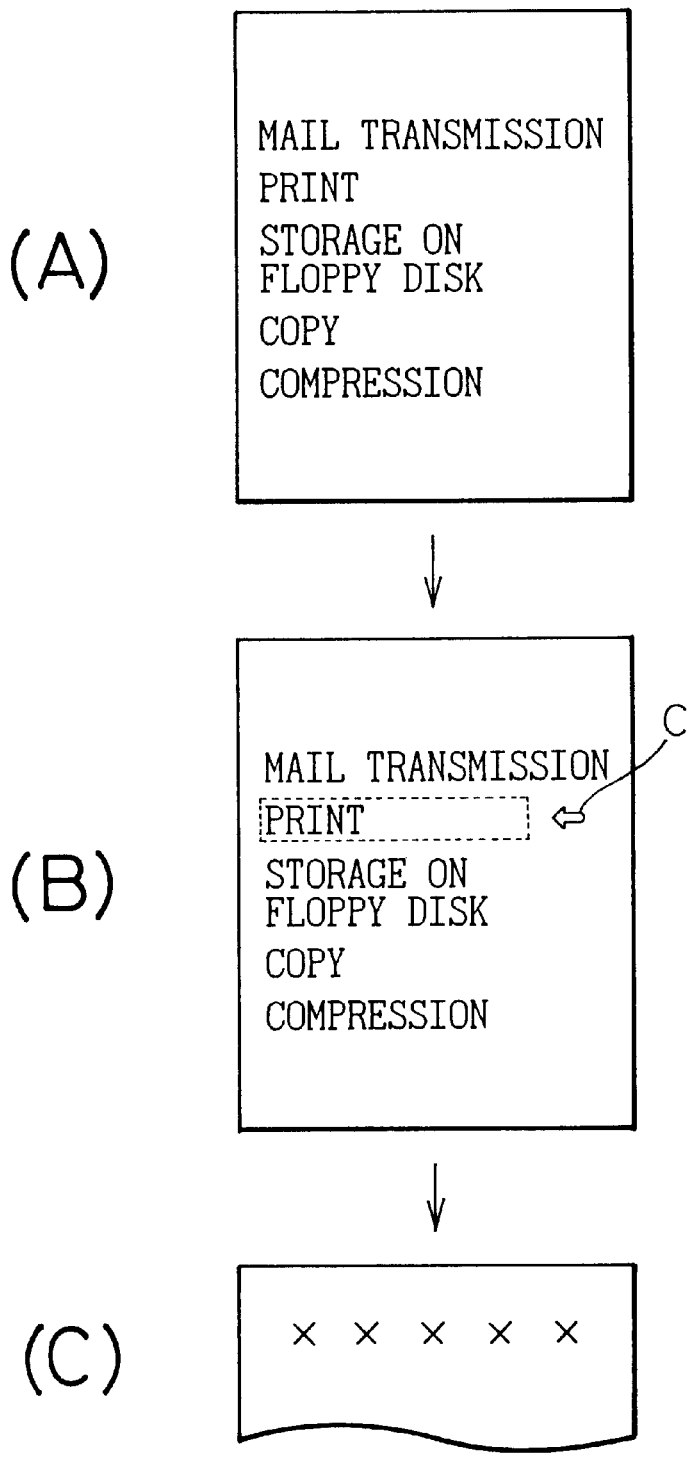
FIG. 13 is a view of an example in which further processing is carried out with respect to the file to be opened.

FIG. 13 is a view of an example in which further processing is carried out with respect to the file to be opened. (A) of the figure shows a screen on which the menu of the processing is displayed by clicking a right button after moving the cursor C of the mouse 3 to the file name F in FIG. 11A.

Here, when the user desires to print the file to be opened by the printer, he or she moves the cursor C to "PRINT" in the menu and double clicks as shown in (B) of FIG. 13, whereby the printing by the printer is executed as shown in (C) of FIG. 13.

Figure 14:
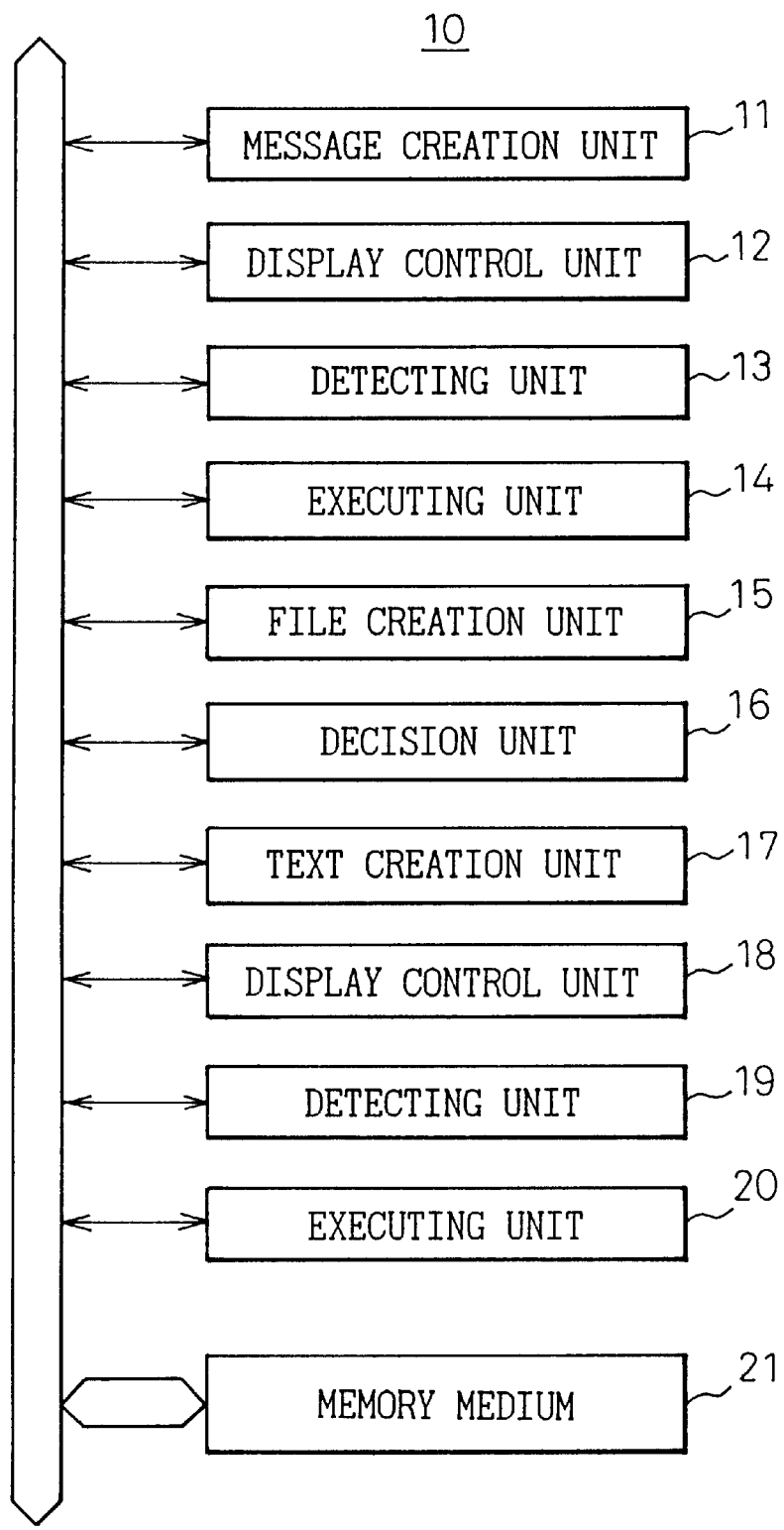
FIG. 14 is a block diagram of a data processing apparatus according to the present invention.

FIG. 14 is a block diagram of a data processing apparatus according to the present invention.

The method for controlling file processing mentioned above can be executed by the data processing apparatus 10 shown in FIG. 14. This data processing apparatus 10 comprises a message creation unit 11 which creates a message containing an ID information of the file and then notifying the result of processing; a display control unit 12 which displays the message; a detecting unit 13 which detects an indication with respect to the file ID information in the message; an executing unit 14 which executes a prescribed processing with respect to the file in accordance with the detection of the indication; a file creation unit 15 which creates the file; a decision unit 16 which determines an attribute of the file; a text creation unit 17 which detects the file ID information in the text to be processed and creating output text containing the specifying information for recognizing the file ID information from the text to be processed; a display control unit 18 which displays content of the output text; a detecting unit 19 which detects the indication with respect to the file ID information in the content of the displayed output text by the specifying information; and an executing unit 20 which executes the prescribed processing with respect to the file in accordance with the detection of the indication.

Further, it provides a storage medium 21 recording a program defining various types of operations based on the present invention.

As explained above, according to the present invention, when a file name is described in the message or text, the corresponding file can be quickly opened by just directly clicking on the file name by the mouse without the troublesome operation as required in the related art.

What is claimed is:

1. A method of controlling file processing, comprising:
    displaying a message comprising ID information of a file;
    detecting a selection with respect to the ID information in the displayed message, the message comprising specifying information which is placed at a front and a rear of the ID information and character data between the specifying information is recognized as the ID information of the file;
    determining an attribute of the file; and
    executing a predetermined process on the file in accordance with the detection of the selection, the predetermined process starts up an application related to the determined attribute of the file.

2. A method of controlling file processing as set forth in claim 1, wherein said message notifies a user of creation of the file.

3. A method of controlling file processing as set forth in claim 1, wherein the predetermined process on the file is one of displaying, reproducing, printing, and externally transmitting content of the file.

4. A method of controlling file processing as set forth in claim 1, wherein
said message comprises specifying information for the ID information indicating that the ID information is a file ID.

5. A method of controlling file processing as set forth in claim 1, further comprising:
determining an attribute of the file; and
utilizes the predetermined process on the file, which starts up an application program related to the attribute of the file.

6. A method of controlling file processing as set forth in claim 5, wherein said specifying information is invisible when the message is displayed.

7. A method of controlling file processing as set forth in claim 5, wherein
said specifying information is placed at the front and rear of the file ID information and
the character data between the specifying information is recognized as the file ID information.

8. A method of controlling file processing as set forth in claim 1, wherein the selection with respect to the file ID information is a selection by operation of a point device.

9. A method of controlling file processing as set forth in claim 1, wherein the file ID information is a file name.

10. A method of controlling file processing, comprising:
detecting file ID information of a file in text to be processed and creating output text comprising specifying information for recognizing said file ID information from the text to be processed, the specifying information is placed at a front and a rear of the ID information and character data between the specifying information is recognized as the ID information of the file;
displaying contents of the created output text;
detecting a selection with respect to the file ID information in the content of the output text displayed by using the specifying information;
determining an attribute of the file; and
executing a predetermined process on the file which starts up an application program related to the attribute of the file in accordance with the detection of the selection.

11. A method of controlling file processing as set forth in claim 10, wherein the predetermined process on the file is one of displaying, reproducing, printing, and externally transmitting the content of the file.

12. A method of controlling file processing as set forth in claim 10, further comprising:
determining an attribute of the file and a predetermined process for the file, the process starts up an application program related to the attribute for processing the file concerned.

13. A data processing apparatus as set forth in claim 10, wherein the content of the output text is displayed while keeping the specifying information invisible.

14. A method of controlling file processing as set forth in claim 10, wherein
said specifying information is placed at the front and rear of the file ID information; and
the character data between the specifying information is recognized as the file ID information.

15. A method of controlling file processing as set forth in claim 10, wherein the selection with respect to the file ID information is a selection by operation of a pointing device.

16. A method of controlling file processing as set forth in claim 10, wherein the file ID information is a file name.

17. A data processing apparatus, comprising:
a message creating unit creating a message comprising a file ID information of a file and specifying information at a front and a rear of the file ID information, and outputting the message;
a display control unit displaying said message;
a detecting unit detecting a selection with respect to the file ID information in the message;
a decision unit determining an attribute of the file; and
an executing unit recognizing character data between the specifying information in the detected selection as the file ID information and executing a prescribed processing with respect to the file, which starts up an application program related to the determined attribute of the file.

18. A data processing apparatus as set forth in claim 17, further comprising:
a file creation unit creating the file, wherein
the message creation unit creates a message notifying a user that the file was created.

19. A data processing apparatus as set forth in claim 17, wherein said executing unit executes, as the predetermined process on the file, one of displaying reproducing, printing, and externally transmitting the content of the file.

20. A data processing apparatus as set forth in claim 17, wherein:
said message creating unit creates a message further containing specifying information for detecting selection with respect to the file ID information, and said detecting unit detects a selection with respect to the file ID information by the specifying information.

21. A data processing apparatus as set forth in claim 17, further comprising:
a decision unit determining an attribute of the file, wherein
said executing unit has a predetermined process for the file, the process starts up an application program related to the attribute of the file.

22. A data processing apparatus as set forth in claim 20, wherein said specifying information is invisible when the message is displayed.

23. A data processing apparatus as set forth in claim 20, wherein
said message creating unit places said specifying information at the front and rear of the file ID information and
said executing unit recognizes the character data between the specifying information as the file ID information.

24. A data processing apparatus as set forth in claim 17, wherein the selection with respect to the file ID information is a selection by operation of a pointing device.

25. A data processing apparatus as set forth in claim 17, wherein the file ID information is a file name.

26. A data processing apparatus, comprising:
a text creating unit detecting file ID information of a file in text to be processed and creating output text comprising specifying information for recognizing said file ID information from the text to be processed, the specifying information is placed at a front and a rear of the file ID information;

a display control unit displaying contents of the created output text;

a detecting unit detecting a selection with respect to the file ID information in the content of the output text displayed by using the specifying information;

a decision unit determining an attribute of the file; and an executing unit recognizing character data sandwiched between the specifying information of the detected selection as the file ID information, and executing a predetermined process with respect to the file, the predetermined process starts up an application program related to the determined attribute of the file.

27. A data processing apparatus as set forth in claim 26, wherein the executing unit performs, as the predetermined process on the file, one of displaying, reproducing, printing, and externally transmitting the content of the file.

28. A data processing apparatus as set forth in claim 26, further comprising:

a decision unit determining an attribute of the file, wherein said executing unit, as the predetermined process on the file, starts up an application program related to an attribute of the file concerned.

29. A data processing apparatus as set forth in claim 26, wherein said display control unit displays content of the output text while keeping the specifying information invisible.

30. A data processing apparatus as set forth in claim 26, wherein said text creating unit places said specifying information at the front and rear of the file ID information and said executing unit recognizes character data between the specifying information as the file ID information.

31. A data processing apparatus as set forth in claim 26, wherein the selection with respect to the file ID information is a selection by operation of a pointing device.

32. A data processing apparatus as set forth in claim 26, wherein the file ID information is a file name.

33. A storage medium able to be read by a computer recording therein a program for controlling a computer by:

displaying a message comprising a file ID information of a file;

detecting a selection with respect to the-file ID information in the displayed message, the file ID information is recognized as character data sandwiched between specifying information, the specifying information is placed at a front and a rear of the file ID information;

executing a predetermined process on the file in accordance with the detected selection.

34. A storage medium able to be read by a computer as set forth in claim 33, wherein the predetermined process starts an application program related to an attribute of the file.

35. A storage medium able to be read by a computer recording a program for controlling a computer by:

detecting file ID information in text to be processed and creating output text comprising specifying information for recognizing said file ID information of a file from the text to be processed, the specifying information is placed at a front and a rear of the file ID information;

displaying contents of the created output text;

detecting a selection with respect to the file ID information in the content of the output text displayed by using the specifying information, and recognizing the character data sandwiched between the specifying information as the file ID information; and executing a predetermined process with respect to the file in accordance with the detection of the selection.

36. A storage medium able to be read by a computer as set forth in claim 35, wherein the predetermined process with respect to the file starts an application program related to an attribute of the file.

37. A method, comprising:

displaying a message comprising a file ID information, specifying information is located at a front and a rear of the file ID information which allows automatic identification of the file ID information;

detecting a selection of the file ID information; and executing a predetermined process on a file corresponding to the selected file ID information, the predetermined process related to an attribute of the file.

38. A computer readable storage, controlling a computer by:

displaying a message comprising a file ID information, specifying information is located at a front and a rear of the file ID information which allows automatic identification of the file ID information;

detecting a selection of the file ID information; and executing a predetermined process on a file corresponding to the selected file ID information, the predetermined process related to an attribute of the file.

39. An apparatus, comprising:

a display unit displaying a message comprising a file ID information, specifying information is located at a front and a rear of the file ID information which allows automatic identification of the file ID information;

an input unit inputting a selection of the file ID information; and an executing unit executing a predetermined process on a file corresponding to the selected file ID information, the predetermined process related to an attribute of the file.

* * * * *

UNITED STATES PATENT AND TRADEMARK OFFICE
CERTIFICATE OF CORRECTION

PATENT NO. : 6,553,374 B1
DATED : April 22, 2003
INVENTOR(S) : Yuki Yamamoto et al.

It is certified that error appears in the above-identified patent and that said Letters Patent is hereby corrected as shown below:

<u>Column 12,</u>
Line 48, begin a new paragraph with "an executing."
Lines 49-50, delete paragraph break.

Signed and Sealed this

First Day of July, 2003

JAMES E. ROGAN
*Director of the United States Patent and Trademark Office*